Oct. 6, 1953
LA VERNE R. PHILPOTT
2,654,881
ECHO RANGING SYSTEM
Filed Feb. 20, 1946
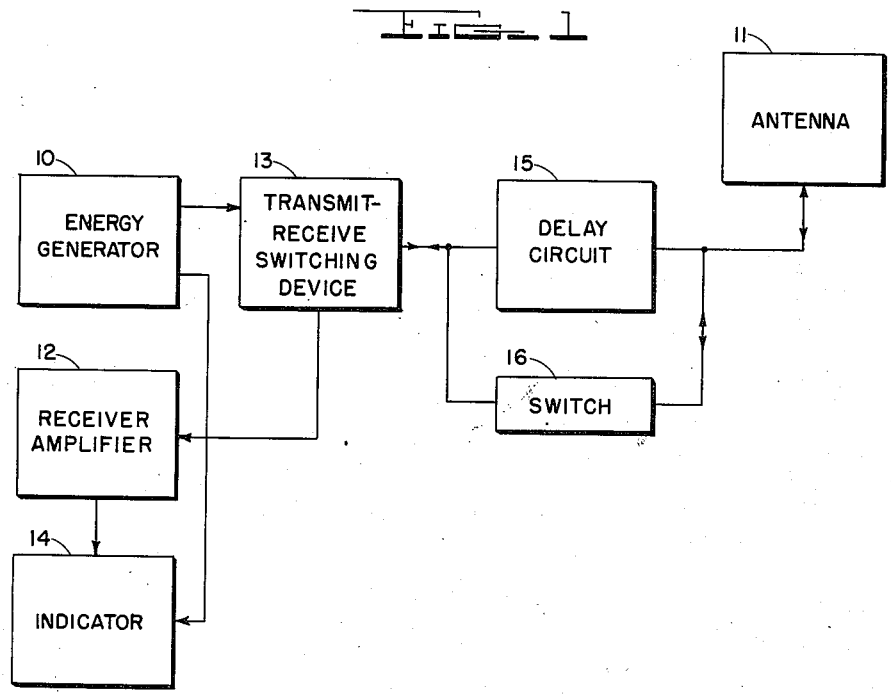
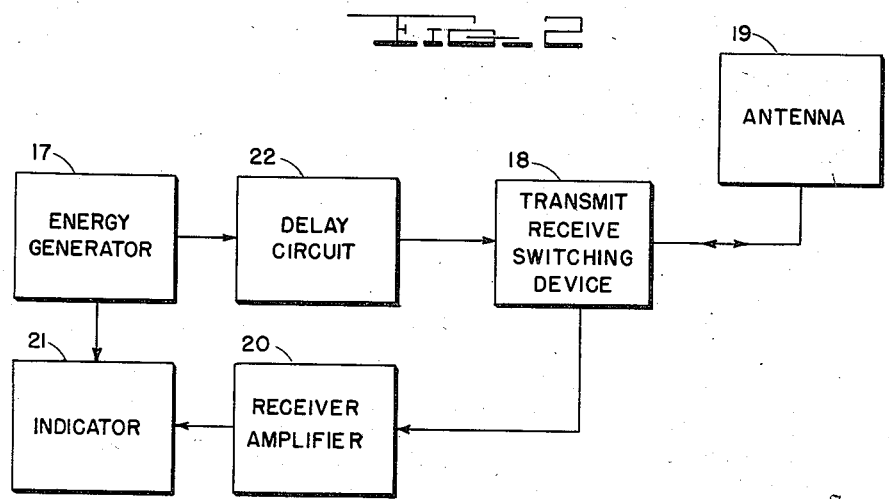
Inventor
LA VERNE R. PHILPOTT
By
Attorney Patented Oct. 6, 1953

2,654,881

UNITED STATES PATENT OFFICE 2,654,881

ECHO RANGING SYSTEM

La Verne R. Philpott, Washington, D. C.

Application February 20, 1946, Serial No. 649,100

1 Claim. (Cl. 343—5)

(Granted under Title 35, U. S. Code (1952), sec. 266)

This invention relates to pulse echo ranging systems and in particular to systems capable of operation at very short ranges.

It frequently is desirable to have a pulse-echo system operable at very short ranges. In conventional pulse echo ranging systems, which generate pulses of energy and then measure the time required for the interception of a part of this pulse energy returned by a reflecting object, detection of nearby reflecting objects is often difficult if not impossible. Such a situation is generally due to two causes. Firstly, the generated pulses are necessarily of some finite duration. It is then apparent that return energy which is reflected from nearby objects will not be discernable if it is received while the pulses of energy are still being generated locally because the outgoing generated energy will be much stronger than the returning energy. Such a condition may be minimized by using generated pulses of short duration but it cannot be eliminated entirely.

A second cause rendering difficult the detection of nearby reflective objects is frequently more serious than the first. The return signals from a reflective object are generally very weak and hence are not directly usable. Some form of amplification system must be employed to bring the signals to a level suitable for measurement. Where the pulse energy is emitted in an electrical form it is desirable that tuned electrical amplification with resonant circuits be employed. Since the passage of some of the emitted energy direct to the receiver amplification system is unavoidable, the relatively strong bursts of emitted energy excite the resonant circuits into oscillation and otherwise momentarily affect time constant circuits in the receiver amplification system. The result of this action is that the receiver amplifier is rendered insensitive to the relatively small amplitude return signals for a short period of time after the emission of a pulse of energy.

A further undesired effect present in pulse echo systems, particularly of the type emitting pulses of electrical radio frequency energy in which the power output generator is an oscillatory device establishing its own radio frequency, is a shift of frequency of the device due to the presence of nearby reflecting objects. The output frequency of such an oscillatory device is generally dependent upon the output loading. Where such an oscillatory device is employed, emitted energy striking a nearby reflecting object may be reflected back to the oscillatory device before the conclusion of the output pulse of energy. This reflected energy reaching the oscillatory device causes a change in the effective loading of the device and hence produces a change in operation frequency. This condition may be so great as to make it impossible for the receiver amplification system to be tuned sufficiently close to the oscillator output frequency either in the presence of reflected signals or in the absence of reflected signals.

It is therefore an object of the present invention to provide a pulse echo ranging system in which the receiver amplification system thereof is rendered sensitive to return signals from nearby reflecting objects.

Another object of the present invention is to provide a pulse echo ranging system employing an oscillatory power output device in which detuning of the power output device is not experienced as a result of returned energy from nearby objects.

Other and further objects and features of the present invention will become apparent upon a careful consideration of the accompanying drawing and following detailed description.

Fig. 1 shows one embodiment of the features of the present invention as applied to an electrical pulse-echo system.

Fig. 2 shows a variant embodiment of some of the features of the present invention.

With reference to Fig. 1, an energy generator 10, which preferably is a high power oscillator such as a magnetron is employed to generate recurrent pulses of high frequency electrical energy. The energy thus generated is supplied to an antenna or radiating device 11. By means of the antenna 11 the generated energy is radiated into space in a direction or directions as determined by the directive characteristics of the antenna 11.

Any reflective object located in the path of the generated energy will then cause the return of a part of this energy to the antenna 11. With the generator 10 in a quiescent condition the returning energy is diverted from the generator 10 and into the receiver amplification system 12 by the transmit-receive switching device 13. The primary function of the switching device 13 is to connect the antenna 11 to the energy generator 10 in the periods of operation of the generator and to connect the receiver amplifier 12 to the antenna in quiescent periods of the generator 10. Because of the construction of the switching device 13 it is not possible to achieve complete routing of energy as just described. It is not possible to prevent entirely the passage of energy from the generator 10 through switch 13 to the receiver amplifier 12 nor to prevent entirely the loss of some returned energy to the generator 10 when it (the generator) is quiescent. The latter energy passage is not too objectionable because only a small portion of the received energy is thus lost. The former energy passage is very objectionable because it causes over-driving of the receiver amplification system. This over-driving of the receiver amplifier 12 causes, among other effects, a saturation excitation of the tuned circuits thereof and the development of voltages by time constant circuits located therein rendering the receiver insensitive to return signals received immediately following the generation of a pulse of energy. By careful design of the receiver amplifier circuits it is possible to hold this period of insensitivity to a minimum. It is not generally possible, however, to reduce the duration of this recovery period to where it is less than the duration of the individual pulses of energy produced by the generator 10.

Amplified signals from the receiver-amplifier 12 are applied to a suitable indicator device 14 which preferably is of the cathode ray tube variety having a time base circuit triggered in time coincidence with the production of a pulse of energy by the generator 10. By means of the indicator device it is possible to determine the time elapsing between the emission of a pulse of energy and the reception of a part of that energy returning from a reflecting object.

The transmit-receive switch 13 is a unilateral device when the energy generator 10 is operative, that is, it will permit the passage of energy from the antenna 11 to the generator 10 as well as the passage of energy from the generator 10 to the antenna 11. The passage of reflected energy from antenna 11 to the generator 10 when the generator 10 is operative effectively produces a changed loading upon generator 10. It is a characteristic of most oscillatory energy sources, particularly a magnetron, that the operational frequency thereof is dependent upon the loading. Thus the frequency of the output energy may vary depending upon the amount of energy delivered to the generator 10 from the antenna 11.

A delay circuit 15 is interposed between the antenna 11 and the transmit-receive switching device 13 to delay the transmission of energy therebetween. This delay circuit is adapted to produce delay by an amount of time equal to or greater than one half the duration of the individual pulses produced by generator 10 with a minimum of energy attenuation and distortion of waveform. This delay may be obtained by means of a transmission line network having lumped or distributed parameters. By means of this delay circuit, energy from the generator 10 is delayed by a period of time at least equal to one-half of the pulse length when it is applied to the antenna 11 and return energy passing from the antenna to the switching device 13 is delayed an additional period of time at least equal to one-half the pulse duration. Thus, even though it is still possible for the receiver amplifier 12 to be rendered inoperative after the termination of a pulse of energy for a period of time equal approximately to the pulse length, return signals from reflecting objects located very close to the antenna 11 cannot reach the receiver amplifier 12 until the passage of a period of time equal to twice the delay time of the circuit 15 has elapsed after the initiation of a pulse by the generator 10. After this time interval the receiver amplifier is again sensitive to small amplitude return pulses which will appear on the indicator 14. It should be noted that calibration of the indicator 14 will have to be readjusted to take care of the delay introduced by circuit 15.

The delay of transmission of energy between the switching device 13 and the antenna 11 also serves to prevent loading of the energy generator 10 by return energy from nearby objects. Since a delay of return energy at least equal to the duration of the output pulse is introduced by the circuit 15, the initial energy in a pulse from generator 10 cannot travel to the antenna 11 and return before the end of the generated pulse. Therefore changed oscillator loading with a consequent shift of the generator frequency cannot be produced by this source.

It is inevitable that some power loss occurs in the delay circuit 15. At close ranges where the delay circuit is necessary to prevent masking of the return signals, the return signals are quite strong and a little sacrifice of power is not too objectionable. Any loss of power is to be avoided where long range operation of the pulse echo system is required. To permit maximum power output for long range operation a switch 16 is provided which may be operated to by-pass the delay circuit. Such a by-passed condition does not, however, give the protection against frequency "pulling" of the oscillation generator by return signals from local reflective objects.

An alternate system arrangement as shown in Fig. 2 may be employed where close range operation is not particularly desired but where freedom from detuning of the oscillation generator is desired.

The general arrangement and the operation of the circuit of Fig. 2 is similar to that of Fig. 1 with certain notable exceptions. Pulses of radio frequency energy produced by the energy generator 17 are applied through the transmit-receive switching device 18 to the antenna 19. Return energy intercepted by the antenna 19 is delivered to the receiver amplifier 20 through the switching device 18. A suitable elapsed time indicator 21 typically of the cathode ray tube type having a time base generator triggered in coincidence with the production of a pulse of energy by generator 17 is employed to indicate time elapsing between the generation of energy and the return of a part of that energy from a reflecting object.

The delay circuit 22 is interposed in the path between the generator 17 and the switching device 18. It is preferable that the time delay produced upon one way travel of energy through the circuit 22 be approximately equal to one-half the pulse duration. Thus, although receiver protection is not obtained as was with the circuit of Fig. 1, the return energy from nearby objects cannot reach the generator 17 until after it ceases functioning. Frequency pulling of the generator 17 is thus eliminated.

From the foregoing discussion it is apparent that considerable modification of the features of this invention are possible and while the devices herein described and the forms of apparatus for the operation thereof constitute preferred embodiments of the invention it is to be understood that the invention is not limited to these precise devices and forms of apparatus and that changes may be made therein without departing from the scope of the invention which is defined in the appended claim.

The invention described herein may be manufactured and used by or for the Government of the United States of America for governmental purposes without the payment of any royalties thereon or therefor.

What is claimed is:

In a radar system which includes a pulse transmitter, a pulse receiver, an antenna, a switch device for coupling said pulse transmitter and receiver to said antenna, the improvement which comprises a pulse delay device, operative to provide a pulse delay at least equal to one-half the radiated pulse duration upon one way travel of energy through said delay device, connected between the pulse transmitter and the switch device.

LA VERNE R. PHILPOTT.

References Cited in the file of this patent

UNITED STATES PATENTS

| Number | Name | Date |
|---|---|---|
| 2,419,205 | Feldman | Apr. 22, 1947 |
| 2,426,501 | Hart | Aug. 26, 1947 |
| 2,433,681 | Blumlein | Dec. 30, 1947 |
| 2,448,016 | Busignies | Aug. 31, 1948 |
| 2,450,341 | Hershberger | Sept. 28, 1948 |
| 2,466,711 | Kenyon | Apr. 12, 1949 |